United States Patent [19]

Hanamoto et al.

[11] 4,259,362

[45] Mar. 31, 1981

[54] PROCESS FOR IMPROVING BAKING PROPERTIES OF UNBLEACHED FLOUR

[75] Inventors: Max M. Hanamoto, Lafayette; Maura M. Bean, Berkeley, both of Calif.

[73] Assignee: The United States of America as represented by the Secretary of Agriculture, Washington, D.C.

[21] Appl. No.: 4,785

[22] Filed: Jan. 19, 1979

Related U.S. Application Data

[63] Continuation-in-part of Ser. No. 768,917, Feb. 15, 1977, Pat. No. 4,157,406.

[51] Int. Cl.³ .............................................. A21D 6/00
[52] U.S. Cl. ..................................... 426/622; 426/473; 426/481; 426/518
[58] Field of Search .................. 426/18, 443, 465, 622, 426/496, 481, 473, 518, 520, 653

[56] References Cited

U.S. PATENT DOCUMENTS

| 1,452,871 | 4/1923 | Dienst | 426/465 |
|---|---|---|---|
| 1,636,569 | 7/1927 | Jones et al. | 426/465 |
| 3,428,461 | 2/1969 | Halton et al. | 426/555 |
| 3,490,917 | 1/1970 | Doe et al. | 426/622 |
| 3,711,297 | 1/1973 | Strobel et al. | 426/622 X |
| 3,974,298 | 8/1976 | Cauvain et al. | 426/622 X |

FOREIGN PATENT DOCUMENTS

| 673414 | 11/1963 | Canada | 426/622 |
|---|---|---|---|
| 228830 | 1/1921 | United Kingdom | 426/622 |
| 537271 | 6/1941 | United Kingdom | 426/518 |
| 861439 | 2/1961 | United Kingdom | 426/622 |

*Primary Examiner*—Esther M. Kepplinger
*Attorney, Agent, or Firm*—M. Howard Silverstein; David G. McConnell; Theodore J. Leitereg

[57] ABSTRACT

Unbleached cake flour is heated at a temperature of 49°–93° C. for 1 hour to ten weeks to improve its baking properties. Starch is subjected to controlled swelling by heating in the presence of excess moisture at a temperature of 54°–71° C. Either treated material or mixtures of both may be substituted for unbleached flour in high-sugar baked good mixes to obtain improved baking properties such as texture, grain, volume, and eating quality.

Unbleached bread flour is simultaneously ground and heated and then subjected to three air-classification steps to obtain a flour suitable for use in high-sugar baked goods.

3 Claims, No Drawings

PROCESS FOR IMPROVING BAKING PROPERTIES OF UNBLEACHED FLOUR

CROSS-REFERENCE TO RELATED APPLICATION

This is a continuation-in-part of co-pending application, Ser. No. 768,917 filed Feb. 15, 1977 now U.S. Pat. No. 4,157,406.

BACKGROUND OF THE INVENTION

1. Field of the Invention

This invention relates to and has among its objects the provision of novel methods for improving the baking properties of unbleached cake and bread flour. Another object of the invention is to provide a process for the controlled swelling of starch. Further objects of the invention will be evident from the following description wherein parts and percentages are by weight unless otherwise specified.

2. Description of the Prior Art

As a matter of custom in the United States wheat flour is normally bleached with chlorine gas prior to its use in baking cakes. Bleaching the wheat flour improves the texture, grain, volume, and eating quality of cakes produced therefrom. Furthermore, the color of white cake is improved when bleached flour is incorporated into the cake mix. As a result of the use of bleached flour, Americans have grown accustomed to cakes possessing the above-mentioned properties. For this reason and the fact that the chlorination process is both practical and economical, the use of bleached flour is firmly embedded in the American cake-baking industry.

In recent years, however, chemical treatments and chemical additives have become suspect and it is desirable to avoid such treatments and additives wherever possible. In addition, many foreign countries prohibit the use of bleached flour in their cake products. As a result, these countries do not import American products such as cake mixes and the like which contain chlorinated flour.

Alternatives to bleaching the flour have been actively sought over the last few years. The alternative treatments must avoid the use of chlorine, and chemicals in general, but still produce flour which will yield the type of cakes customarily obtained with bleached flour. One alternative to the chlorination method is to subject the flour to specified temperatures for limited periods of time. All of the known methods require a preliminary treatment. For example, in U.S. Pat. No. 3,490,917 normal soft wheat flour or starch is subjected first to air classification to obtain flour containing a major proportion of free starch granules or granules substantially free from enveloping gluten. The treated material is heated at a temperature of 100° to 140° C. for about 30 minutes to a maximum period such that no dextrinisation of the starch occurs. Then, the treated flour or starch is combined with dried viable gluten to give a flour useful in cake and sponge recipes. Recently, in British Pat. No. 1,499,986 it was shown that the preliminary air-classification step is unnecessary.

The methods of U.S. Pat. Nos. 1,452,871 and 3,974,298 (hereinafter referred to as '871 and '298, respectively) begin with a dehydration step. Thus, in '871 flour is dried under vacuum at 45° C. to the exclusion of atmospheric air and under constant agitation and then rapidly and strongly cooled to zero degrees (centigrade) or less under vacuum with constant agitation and in the absence of atmospheric air.

In the process of '298 whole wheat, or a milling intermediate, is dried to a moisture content of 6% or less and heated at 100° to 140° C., or 100° to 200° C. in the case of a milling intermediate, for a sufficient period. The treated whole wheat is cooled and then ground to produce flour. It is noted in the specification that departure from the teachings will yield a flour which is not a suitable replacement for chlorinated flour.

Hard wheat flour has been subjected to various heat treatments to improve bread-making or cake-making properties. According to U.S. Pat. No. 3,428,461 bread flour (i.e., hard wheat flour) can be heated at 66° to 182° C. for about 1 minute to 17 hours, preferably at 121° to 182° C. for about 10 to 80 minutes to render it suitable for cake mixes. Heating whole wheat at about 50° to 80° C. gives mild improvement in the bread-making properties of the resulting flour ('298).

SUMMARY OF THE INVENTION

We have found that the baking properties of wheat flour itself can be improved without use of chlorine or other chemical agents. In accordance with one aspect of the present invention raw, non-dehydrated soft wheat flour is heated at a temperature of 49°–93° C. for a period of 1 hour to ten weeks. The so-treated flour exhibits improved baking properties and may be used to prepare high-sugar bakes goods, such as cakes and the like.

Further in accordance with the invention, starch can be treated to obtain limited swelling thereof. In the latter process starch is mixed with excess water and held at a temperature of 54°–71° C. for a period of time great enough to swell the starch granules but not so great as to cause fragmentation thereof. The so-prepared starch can be used in cake mixes to replace a portion of the unbleached flour and the resulting baked products exhibit improved properties.

A most important phase of the invention is that flour heat-treated in accordance with the invention can be mixed with starch which has been subjected to controlled swelling in accordance with the invention. Cakes prepared from cake mixes formulated thusly exhibit properties substantially more improved than those obtained when the products of each of the above treatments are employed separately and more improved than those produced from bleached flour.

A primary advantage of the heat treatment of the invention is that it avoids preliminary procedures, such as air classification and dehydration, considered essential by the prior art. Furthermore, the heat treatment is conducted at temperatures lower than in known methods and can be applied to milled flour. Thus, the process described herein is more economical than present methods.

Another advantage of the invention is that no chemicals are necessary to improve the baking properties of the flour. Consequently, the process of the invention does not pose a potential hazard to the health of those who consume the products. In addition, foreign countries will not prohibit cake mixes and the like prepared from flour which has been treated in accordance with the invention.

A further item is that the baking properties, such as texture, grain, and volume, of the flour and the starch are improved over those of unbleached flour. In addition, the texture, grain, and eating quality of products prepared from mixtures of flour heat-treated according to the method of the invention and starch which has been swelled according to the invention are better than the texture, grain, and eating quality of products prepared from bleached flour or products prepared from either the heat-treated flour or the controlled swelled starch of the invention.

Another advantage of the invention is that the eating quality of products prepared from flour and starch treated by the method of the invention is excellent. The so-prepared products possess a moistness not found in conventional cakes and other products. Furthermore, the baked products of the instant method do not crumble when eaten.

A final point is that the color of white cakes prepared from mixtures of the flour and starch of the invention is close to the white color associated with cakes prepared from bleached flour. This is an important factor in facilitating consumer acceptance of the instant products.

Another aspect of the present invention concerns the production of flour suitable as a substitute for bleached flour in cake formulations from hard wheat flour. To this end hard wheat flour is ground in a turbo-mill grinder at elevated temperatures and then subjected to several air-classification steps. An advantage of this particular phase of the invention, in addition to those advantages enumerated above, is that a superior hard wheat flour useful in bread-making can be prepared by our method from a poor hard wheat flour, which would not ordinarily be desirable for bread-making. The latter flour would be a by-product of the above-described procedure.

DESCRIPTION OF THE PREFERRED EMBODIMENTS

One part of the invention concerns heat treatment of unbleached cake flour, i.e., soft wheat flour used in high-sugar baked goods. In proceeding in accordance with the invention raw, non-dehydrated, unbleached, soft wheat flour is stored at elevated temperatures. In general, the temperature of the flour should be about 49°–93° C. and the duration of the storage should be about one hour to ten weeks. For optimum results, the raw flour should be stored at 71° C. for about 4–5 days. It should be noted that prolonged heating of wheat flour at high temperatures imparts an undesirable toasted flavor to the flour. Consequently, if temperatures above 88° C. (i.e., from 88°–93° C.) are employed the period of storage should be less than 24 hours; the time period being less, the greater the temperature.

The flour may become partially dehydrated during the above heat treatment (usually about 1 to 3% reduction in moisture content). If the moisture level of the flour has been reduced, it may be desirable to add water to the flour to restore its moisture to the natural level. It is within the compass of the invention to heat-treat flour in a closed container to minimize loss of moisture.

The so-prepared flour can be used to produce high-sugar baked goods such as cakes, etc., following conventional recipes. In preparing baked products containing flour heat-treated as described above, one merely substitutes the flour of the invention for the bleached flour required by the recipe. Other ingredients are added as in ordinary baking procedures.

Another phase of the invention deals with the limited swelling of starch induced by heat in the presence of excess moisture. Usually, about 1 to 10 parts of water are employed per part of starch with about 3 to 5 parts of water per part of starch being preferred. The starch is slurried with water and the slurry is heated at a temperature of about 54°–71° C. The pH of the slurry should be about 5.5–6, the ambient pH of the starch. The slurry should be heated for a period of time sufficient to swell the starch granules. However, the heating should not be continued to the point whereat the starch granules become fragmented. Usually, the slurry is heated for a period of about 5 to 60 seconds. In any event, the correct period of heating can be determined by pilot trials.

After the starch slurry has been treated as described above, it can be used directly with conventional ingredients to produce baked products with improved properties. On the other hand, the starch slurry can be treated to remove excess water therefrom. Such conventional separation techniques as filtration, centrifugation, and the like may be used to remove bulk amounts of water. The so-recovered starch can then be dried and used in place of unbleached flour in conventional recipes for baked goods. Preferably, about 5 to 20%, based on the total weight of flour, of the controlled swelled starch is used but improved baking properties are obtained when about 1 to 40%, based on the total weight of flour, of the starch of the invention is substituted for untreated flour in conventional baked mixes.

The above process can be practiced on starch from all types of sources such as wheat, corn, potatoes, etc.

It is an important aspect of the present invention to combine the heat-treated flour of the invention with the controlled swelled starch of the invention to give products with properties such as texture, grain, and eating quality which are superior to those properties of products prepared separately from either the flour or starch of the invention. Usually, about 3 to 15 parts of heat-treated flour are used per part of controlled swelled starch.

We have also discovered that raw, non-dehydrated, unbleached hard wheat flour can be rendered suitable for use in cake formulations. High sugar, baked products, such as cakes and the like, require soft wheat flour, i.e., flour containing about 5 to 9% protein. On the other hand, hard wheat flour of about 11 to 16% protein content is employed in bread-making. In our process hard wheat flour is ground in a turbo-milling apparatus during which process the temperature of the flour is maintained in the range of about 120°–140° C. Following the turbo-milling step, the heated and milled flour is subjected to air-classification in a commercial device. In air-classification flour is rotated under reduced pressure with introduction of secondary air. The rotation of the flour causes a centrifugal force which pulls larger (coarse) particles to the periphery of the apparatus from whence they are removed. Lighter (fine) particles are drawn through a central opening in the apparatus. The introduction of a certain volume of secondary air results in the separation of a certain particle size. By increasing the volume of secondary air a separation at greater particle size is accomplished.

In the instant process the heated, turbo-milled flour is subjected to three air-classification procedures for varying periods and rates of secondary air flow (saf) and flour flow-rate (ffr). In the first air-classification the saf and ffr are adjusted such that about 85–95% coarse particles and 5–15% fine particles are obtained. Generally, this is accomplished with an saf of 4–6 cubic meters per hour (cu.m/hr) and an ffr of 4–5 kilograms per hour (kg/hr) and an air-classification time period of about 45–50 minutes. The so-classified coarse particles are again subjected to air-classification with increased saf and ffr thereby securing between 85-95% coarse particles and 5-15% fine particles. In this air-classification step the saf is usually about 12-13 cu.m/hr for an ffr of about 9-10 kg/hr and the duration of treatment is about 40-45 minutes. Again, the coarse particles are air-classified under conditions which will give a fraction containing 25-45% coarse particles and a fraction containing 55-75% fine particles, preferably, 40-45% coarse particles and 55-60% fine particles. For this step the saf and ffr are 20-25 cu.m/hr and 27-30 kg/hr and the time is about 10-15 minutes. The so-obtained fine particles, containing approximately 5-9% protein, are suitable as a substitute for bleached flour in cake and other high sugar baked goods formulations.

The times and rates given above were determined on a Walther laboratory air-classifier manufactured by Walter-Staubtechnik, C-M-B-H, Koln-Dellbruck, Wirbelsichter, Gerate NR. 182 and distributed by Miag North America, Inc., Minneapolis, Minn. It is within the scope of the invention to use other air-classification apparatus. The above percentages for separation of fine and coarse particles together with the above times and rates will provide one skilled in the art with the necessary information to carry out the method of the invention successfully regardless of the type of air-classification device. These parameters are further dependent on the nature and type of hard wheat flour used. In some cases pilot trials may be employed to determine particular times and rates required to obtain a separation in accordance with the invention.

The above separation is quite surprising and unexpected for the following reasons. In the first and second air-classification steps the fine particles have a very high protein content whereas the coarse particles are low in protein. This trend is reversed in the third step, the fine particles containing considerably less protein than the coarse. If the initial turbo-milling procedure of the invention is omitted, the reversal described above does not occur and the fine particles contain more protein than the coarse ones, thus rendering the process ineffective in producing a flour suitable as a replacement for bleached flour.

It is also within the compass of the above invention to secure a flour suitable for making bread from a flour exhibiting poor bread-making qualities. In proceeding in accordance with this particular embodiment of the invention, the fine (high protein) particles from the first and second air-classification steps are combined with the parent flour, i.e., raw, non-dehydrated, unbleached hard wheat flour to yield a flour containing greater than 11% protein suitable for use in bread-making. The resulting combined flour has a protein content of about 14-16% whereas the starting flour contains about 10-11% protein.

EXAMPLES

The invention is further demonstrated by the following illustrative examples.

EXAMPLE 1

Heat Treatment of Unbleached Flour

Raw, non-dehydrated unbleached soft wheat (cake) flour (100 g) was stored in a closed container at a temperature of 71° C. for 4 days.

The so-prepared flour was used in the preparation of white layer cakes according to the following recipe:

| Ingredient | Weight (g) |
|---|---|
| Cake flour | 100* |
| Sugar | 120 |
| Cake shortening | 50 |
| Dry non-fat milk solids | 12 |
| Dried egg whites | 9 |
| Baking powder | 7 |
| Salt | 3 |
| Water | 135 |

*14% moisture content

The raw cakes were baked at 190° C. for 24 minutes.

Cakes were also prepared using bleached flour and unbleached flour. Of course, these cakes are not in accordance with the invention and are included only for comparative purposes.

The cake volume, grain, texture, and eating quality of the above cakes were determined; the results are summarized below.

| Flour Used | Cake Volume (cc) | Grain* | Texture* | Eating quality |
|---|---|---|---|---|
| Heat-treated at 71° C. for 4 days | 1090 | 18.0 | 17.8 | good, moist |
| Bleached (control) | 1085 | 18.5 | 18.5 | good, slightly dry |
| Unbleached (control) | 955 | 16.5 | 16.5 | very pasty |

*20 point scale, visual observation

EXAMPLE 2

Controlled Swelling of Starch

Starch (1 kg) was mixed with 5 l. of water and heated at 60° C. for 10 seconds. The slurry was cooled by means of a plate-type heat exchanger. The slurry was recovered by centrifuging the slurry in a De Laval disc-type high speed solid discharger centrifuge. The so-collected solids were freeze-dried and ground to pass 40 mesh screen in a Wiley Mill.

Cakes were prepared as described in Example 1. The starch from above was employed, replacing 20% of unbleached flour in the aforementioned recipe. The results are tabulated below.

| Flour Used | Cake Volume (cc) | Grain | Texture | Eating Quality |
|---|---|---|---|---|
| 20% controlled swelled starch plus 80% unbleached flour | 1055 | 17.3 | 17.5 | good, moist |
| Unbleached flour (control) | 995 | 16.5 | 16.8 | pasty |
| Bleached flour (control) | 1060 | 18.5 | 18.3 | good, slightly dry |

EXAMPLE 3

Blend of Heat-treated Flour and Controlled Swelled Starch

The recipe described in Example 1 was followed. The results are summarized in the following table. Flours used were:

A—80% heat-treated flour (from Example 1) plus 20% controlled swelled starch (from Example 2)

B—Heat-treated flour (from Example 1)
C—Bleached flour (control)
D—Unbleached flour (control)

| Flour Used | Cake Volume (cc) | Grain | Texture | Eating Quality |
|---|---|---|---|---|
| A | 1050 | 18.3 | 18.3 | very good, moist and tender |
| B | 1115 | 18.0 | 18.0 | good, moist |
| C (control) | 1060 | 18.5 | 18.3 | good, slightly dry |
| D (control) | 965 | 16.0 | 16.0 | very pasty |

EXAMPLE 4

Turbo-milling, Heat, and Air-Classification Process

Raw, non-dehydrated, unbleached, hard wheat flour (1000 g, 11.2% protein) was placed in a standard turbo-milling machine (Pillsbury Turbo-grinder, Pillsbury Mills, Minneapolis, Minn.) equipped with a heating unit. The flour was ground at a temperature of 132° C. at a rate of 8 kilograms per hour.

The so-treated flour was placed in a Miag air-classification apparatus operated at a secondary air flow (saf) of 5 cu.m/hr and a flour flow rate (ffr) of 4.5 kg/hr for 45 minutes. In this manner 930 g coarse particles (10.2% protein) and 70 g fine particles (25.3% protein) were obtained.

The coarse particles (930 g) were again air-classified at 12.5 cu.m/hr saf and 9 kg/hr ffr for 40 minutes to give 856 g of coarse particles (9.4% protein) and 74 g of fine particles (20.5% protein).

Air-classification was applied to the 856 g of coarse particles from above. The saf was 25 cu.m/hr and the ffr was 27 kg/hr; the treatment was conducted for 10 minutes. The coarse particle fraction (B) weighed 360 g and contained 11.8% protein; the fine particles weighed 496 g (A) with a protein content of 6.7%.

Cakes were prepared as described in Example 1. The results are summarized below. Control flour was air-classified as described above but was not heated and ground in a turbo-mill.

| Flour Used | Cake Volume (cc) | Grain* | Eating Quality |
|---|---|---|---|
| A | 1080 | 18.0 | Good, moist |
| Control | 910 | 17.0 | Very pasty |

*Perfect grain score = 20

EXAMPLE 5

The process of Example 4 was applied to 1000 g of raw, non-dehydrated, unbleached, all purpose flour (10.2% protein). In the first air-classification 880 g of coarse particles (8.0% protein) and 120 g of fine particles (21.3% protein) were obtained; in the second, 748 g of coarse particles (6.8% protein) and 102 g of fine particles (14.8% protein); in the third, 202 g of coarse (D) particles (10.9% protein) and 546 g of fine (C) particles (5.0% protein).

Cakes were prepared as described in Example 1; the results are tabularized below.

| Flour Used | Cake Volume (cc) | Grain* | Eating Quality |
|---|---|---|---|
| C | 1055 | 18.0 | Good, moist |
| Control | 810 | 16.8 | Pasty |

*Perfect grain score = 20

Having thus described our invention, we claim:

1. A process for preparing flour suitable for use in producing high-sugar-baked goods of good volume, texture, grain, and eating quality, from raw, non-dehydrated, unbleached hard wheat flour, which comprises—
   (a) simultaneously heating the flour at a temperature of about 120°–140° C. and grinding the flour in a turbo-mill,
   (b) air-classifying the so-heated and so-ground flour to separate the flour into a fraction containing 85–95% coarse particles and a fraction containing 5–15% fine particles,
   (c) air-classifying the once-separated coarse particles to give a fraction containing 85–95% coarse particles and a fraction containing 5–15% fine particles, and
   (d) air-classifying the twice-separated coarse particles to give a fraction containing 25–45% coarse particles and a fraction containing 55–75% fine particles with a protein content of about 5–9%, the latter being suitable for use in producing high sugar baked goods.

2. The process of claim 1 wherein
   the first air-classification is conducted with a secondary air flow of about 4–6 cubic meters per hour and a flour flow rate of about 4–5 kilograms per hour for a period of about 45–50 minutes,
   the second air-classification is conducted with a secondary air flow of about 12–13 cubic meters per hour and a flour flow rate of about 9–10 kilograms per hour for a period of about 40–45 minutes, and
   the third air-classification is conducted with a secondary air flow of about 20–25 cubic meters per hour and a flour flow rate of about 27–30 kilograms per hour for a period of about 10–15 minutes.

3. The process of claim 1 wherein the fractions containing fine particles from the first and second air-classifications are combined with the raw, non-dehydrated, unbleached hard wheat flour to yield a flour containing greater than 11% protein suitable for use in read-making.

* * * * *

UNITED STATES PATENT AND TRADEMARK OFFICE
CERTIFICATE OF CORRECTION

PATENT NO. : 4,259,362

DATED : March 31, 1981

INVENTOR(S) : Max M. Hanamoto and Maura M. Bean

It is certified that error appears in the above—identified patent and that said Letters Patent is hereby corrected as shown below:

Column 2, line 29, cancel "bakes" and insert --baked--.

Column 8, line 55, cancel "read-making" and insert --bread-making--.

Signed and Sealed this

Twenty-third Day of June 1981

[SEAL]

Attest:

RENE D. TEGTMEYER

Attesting Officer     Acting Commissioner of Patents and Trademarks